Figure 1:
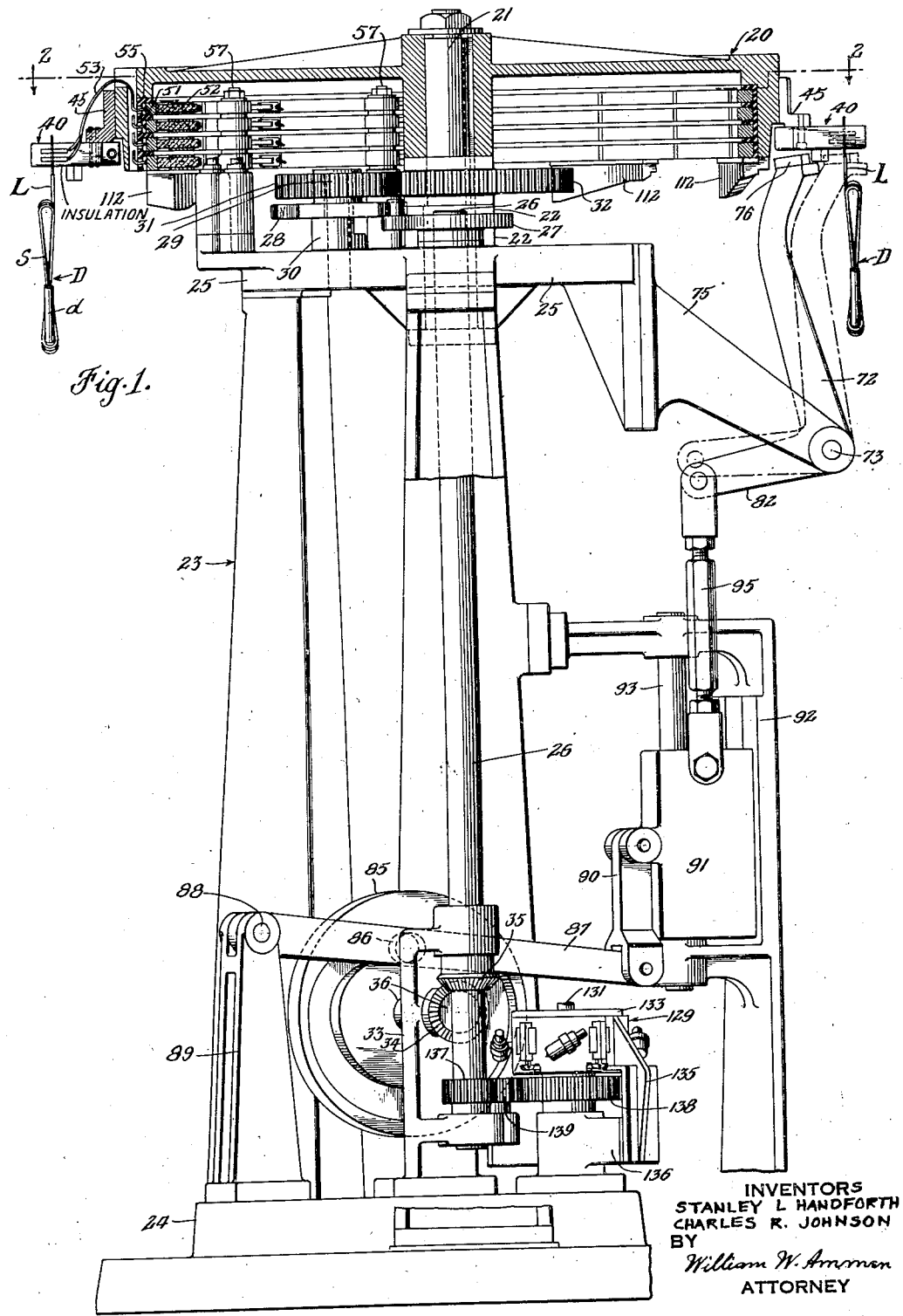

March 18, 1947. S. L. HANDFORTH ET AL 2,417,488
MACHINE FOR TESTING AND ASSORTING RESISTANCE ELEMENTS
Filed June 13, 1942 9 Sheets-Sheet 1

INVENTORS
STANLEY L HANDFORTH
CHARLES R. JOHNSON
BY
William W. Ammen
ATTORNEY

March 18, 1947.  S. L. HANDFORTH ET AL  2,417,488
MACHINE FOR TESTING AND ASSORTING RESISTANCE ELEMENTS
Filed June 13, 1942   9 Sheets-Sheet 3

INVENTORS
STANLEY L. HANDFORTH
CHARLES R. JOHNSON
BY
William W. Ammen
ATTORNEY

March 18, 1947. S. L. HANDFORTH ET AL 2,417,488
MACHINE FOR TESTING AND ASSORTING RESISTANCE ELEMENTS
Filed June 13, 1942 9 Sheets-Sheet 4

INVENTORS
STANLEY L. HANDFORTH
CHARLES R. JOHNSON
BY
William W. Ammen
ATTORNEY

March 18, 1947. S. L. HANDFORTH ET AL 2,417,488
MACHINE FOR TESTING AND ASSORTING RESISTANCE ELEMENTS
Filed June 13, 1942 9 Sheets-Sheet 5

INVENTORS
STANLEY L. HANDFORTH
CHARLES R. JOHNSON
BY
William W. Ammen
ATTORNEY

March 18, 1947. S. L. HANDFORTH ET AL 2,417,488
MACHINE FOR TESTING AND ASSORTING RESISTANCE ELEMENTS
Filed June 13, 1942 9 Sheets-Sheet 6

INVENTORS
STANLEY L. HANDFORTH
CHARLES R. JOHNSON
BY
William W. Ammen
ATTORNEY

March 18, 1947. S. L. HANDFORTH ET AL 2,417,488
MACHINE FOR TESTING AND ASSORTING RESISTANCE ELEMENTS
Filed June 13, 1942 9 Sheets-Sheet 7
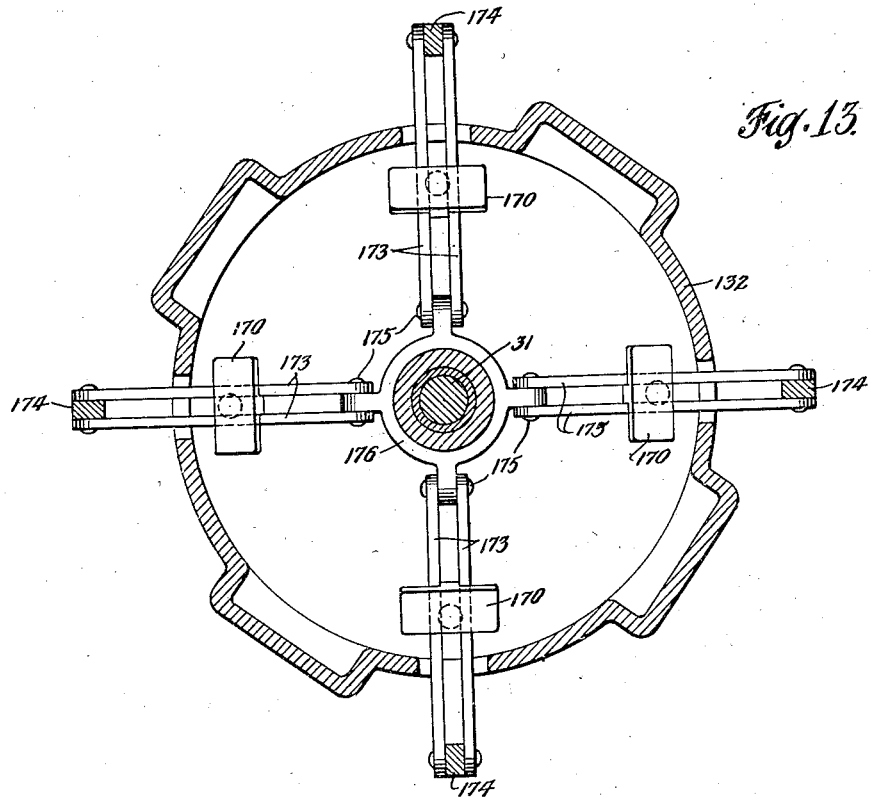
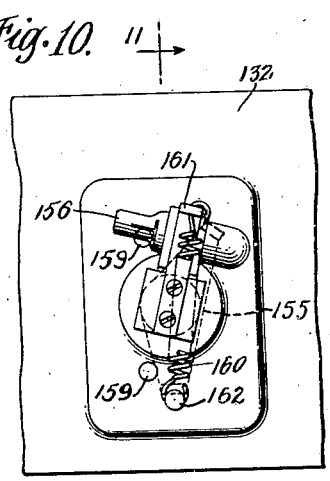
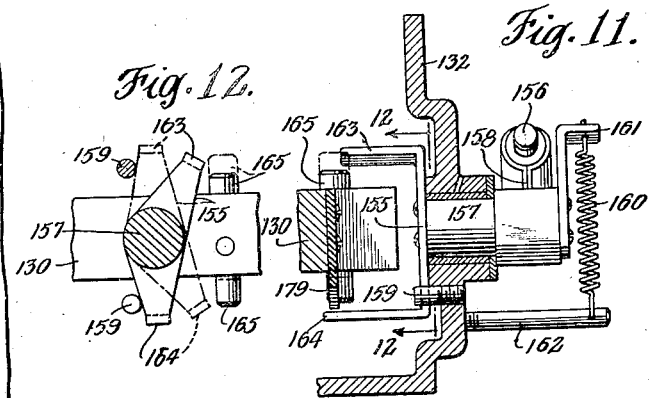
INVENTORS
STANLEY L. HANDFORTH
CHARLES R. JOHNSON
BY
William W. Ammen
ATTORNEY

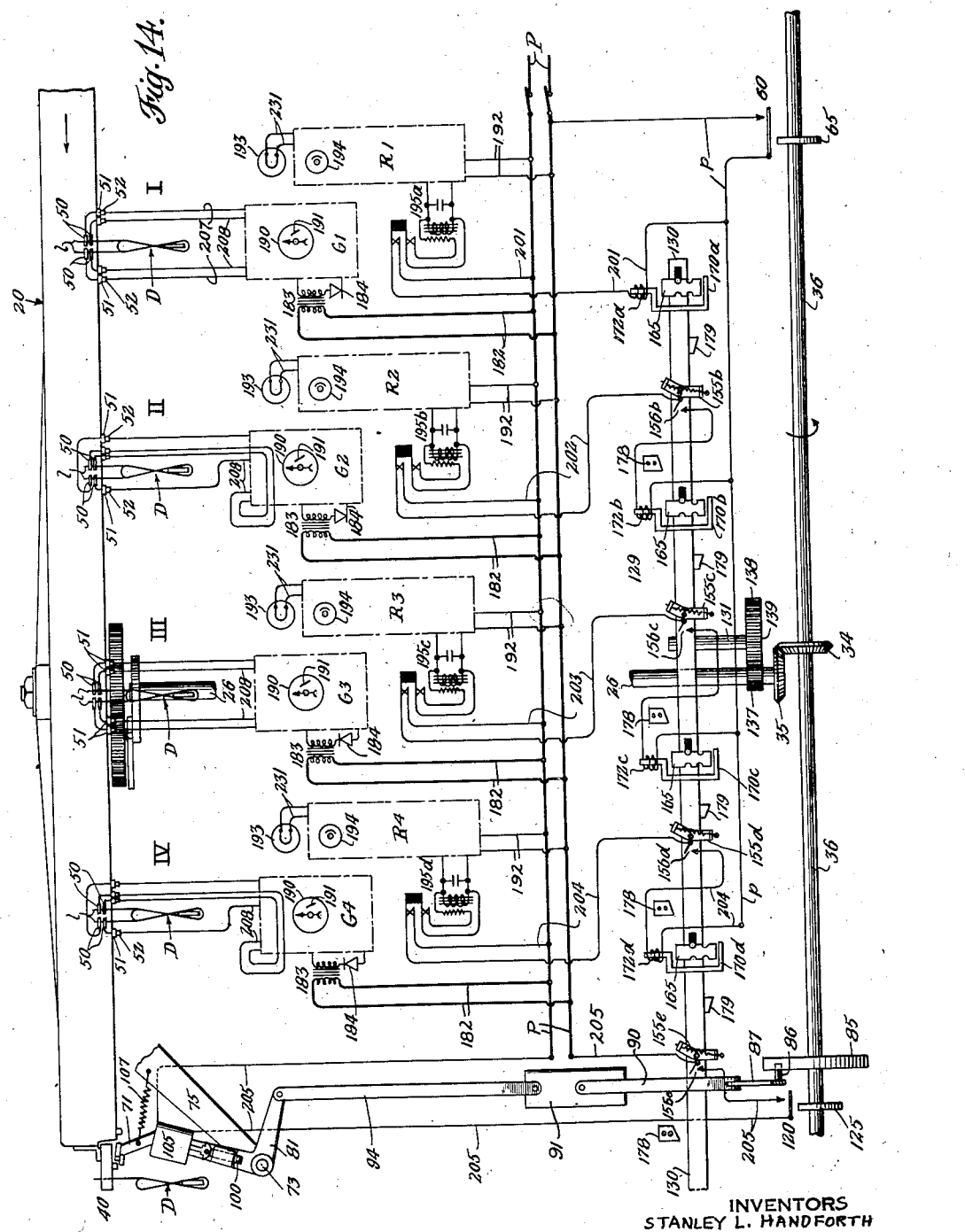

March 18, 1947.    S. L. HANDFORTH ET AL    2,417,488
MACHINE FOR TESTING AND ASSORTING RESISTANCE ELEMENTS
Filed June 13, 1942    9 Sheets-Sheet 9

INVENTORS
STANLEY L. HANDFORTH
CHARLES R. JOHNSON
BY
William W. Ammen
ATTORNEY

Patented Mar. 18, 1947

2,417,488

UNITED STATES PATENT OFFICE 2,417,488

MACHINE FOR TESTING AND ASSORTING RESISTANCE ELEMENTS

Stanley L. Handforth, Wilmington, Del., and Charles R. Johnson, Glenn Mills, Pa., assignors to E. I. du Pont de Nemours & Company, Wilmington, Del., a corporation of Delaware Application June 13, 1942, Serial No. 446,980

36 Claims. (Cl. 209—81)

This invention relates to testing and the like, including tests that involve application of testing power to devices to be tested, as by passing electric current through them, or subjecting them to applied voltage. The invention presents features of novelty as regards the operations more directly involved in the testing, and also as regards manipulating or handling the devices, and includes novel apparatus and mechanism for these purposes. While the invention is hereinafter explained with particular reference to a system of operations, apparatus, and mechanism in which testing and manipulation are combined, yet various features included in this system may if desired be used separately, or in embodiments or combinations involving methods, mechanisms, or parts quite different from those here illustrated.

A class of devices for which the invention is very useful consists of those having electric circuits whose resistance or impedance should be of definite values, or should lie within a range between definite maximum and minimum limits. Such devices may include current leads or conductors of relatively low resistance with an interposed resistance element or feature, such as a short length of fine wire or filament, for example. The effective overall "internal" resistance of such a device depends on the lengths and sizes of its lead-wires, the intervening length and size of resistance-wire or filament, and the characteristics of any joints between its components—and also, of course, on the uniformity and integrity of leads, resistance element, and joints. The over-all resistance of the device also depends on the materials of its several components. Errors involving any of these resistance-determining factors may readily occur in manufacture, and are difficult of detection by direct inspection; so that an over-all test that will reveal any deviation of the resistance or impedance of the device from standard (in excess of allowable tolerances) is desirable, and may in some cases be practically imperative, A particular class of devices in which conformity to standards and reliable detection of variations beyond allowable tolerances are peculiarly important and delicate consists of electric detonators or blasting caps. The usual detonator or blasting cap comprises a charge of very powerful and sensitive explosive, such as mercury fulminate, packed in a metal shell or "cap" around a fine "bridgewire," which is connected between long insulated lead-wires—some four to twelve feet long, more or less. It is very important that the electric circuit resistance of a detonator through its leads and bridgewire should meet carefully determined and exacting specifications, so that detonators shall fire reliably on their rated firing current; for a detonator that does not fire cannot safely be replaced with another detonator, and yet the unfired charge of dynamite in the rock or structure to be blasted is far too dangerous to be left undealt with. Because of the limited energy available for firing detonators from batteries of dry cells (in places often remote from power lines), their bridgewires have to be very fine and fragile, so that the charging and packing of fulminate or the like around the bridgewires is a delicate operation—to say nothing of the sensitiveness of the fulminate, and the danger of accidentally setting it off during all stages of the charging, completion, and packeting of the detonators. In practice, it has been found advisable to attach the bridgewires directly to the long insulated copper wires that are used as leads, since detonator leads with mechanically formed joints in them would give a circuit of uncertain integrity and electrical resistance, while the making of autogenous or welded lead joints after the detonators had been charged with explosive would be likely to give rise to explosions. The length of the leads makes it necessary to wind them up into some compact form, to make a package suitable for shipment—such as an alongated coil or skein, which may be of the "figure-8" type. It is generally preferable to test the electrical resistance of the detonator after its leads have been wound or coiled.

The possibility of accidental explosion of detonators during manipulation or testing is a very serious hazard; for while the quantity of explosive in a detonator is small, yet to fire dynamite reliably it has to be so powerful that explosion of a single detonator may blow a person's hand off, and simultaneous explosion of a bunch of detonators may inflict a fatal injury.

An important object of this invention is to facilitate, expedite, and cheapen the manipulation and testing of the devices. In the case of detonators or other explosive devices, we also aim to obviate or minimize the risk of accidental explosions and of injuries to workers. The invention may be used not only for distinguishing or rejecting devices that are defective or unsatisfactory from satisfactory devices, but also for discriminating amongst or sorting out devices of different ratings when intermingled.

In a preferred mode of carrying out our invention, a plurality of devices are tested more or less concurrently, or in overlapping sequence—in other words, in relations of partial concurrence. This allows output of fully tested devices at a desirably rapid rate, while all the work with them is done comparatively slowly—which is very desirable in order to obviate or minimize risks of accidental explosions. The apparatus may include a plurality of testing connectors, and each device may be connected several times and undergo several tests, which may be either diverse or identical—repetition of the same test affording a measure of protection against erroneous indications from any one test. In successive tests which are otherwise repetitive, the connections of electric contact terminals of the connectors to the testing circuits may be reversed, so as to obviate errors due to contact resistance. The characteristics and the consequent responses of devices under test may be specially indicated to an observer in any preferred manner, or may be made apparent as a sorting out or separation amongst the devices that have been tested, determined automatically by their behavior under test—as by means responsive to flow of current through the devices, under applied voltage, according to their electrical resistances. In such a test, absence of current flow of course indicates some defect in the internal circuit of a device.

A convenient way of testing and sorting devices is to provide for their traveling or being fed to and from the testing means or connectors in succession, and to direct the tested devices diversely according to their behavior under test—as by rejecting or diverting devices from their course of travel, or by releasing or rejecting such devices from the feeding or conveyor means whereby they are fed or carried along to or past the testing means. The movement of the devices may be intermittent or step-by-step, with pauses during which testing power or voltage is applied through the testing circuits and the connectors. The direction, diversion, release, or rejection of the devices is automatically determined in response to the behavior of the devices when tested.

A variety of types of electrical testing and control apparatus are suitable for passing current through the devices under test and for indicating or registering their behavior and determining the action of the sorting or separating means in response thereto, according to the impedance or resistance of the devices. Besides the particular combination of circuits and apparatus here illustrated and described, various known testing and control systems comprising electronic, electromagnetic, or other relays are readily adaptable for the purpose.

Various other features and advantages of the invention will appear from the following description of a species or form of embodiment, and from the drawings. All the features and combinations shown or described are of our invention, so far as they are novel.

Figure 2:
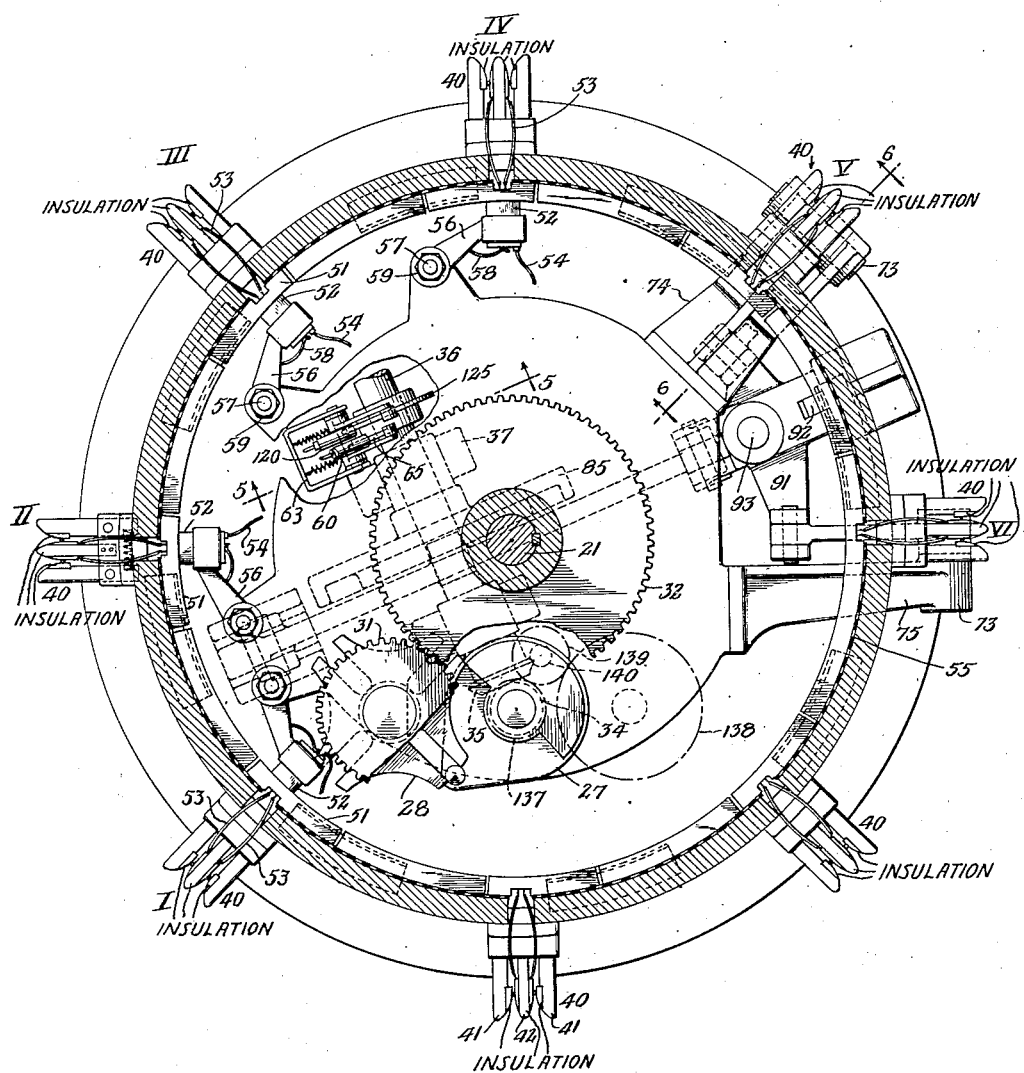
Figure 3:
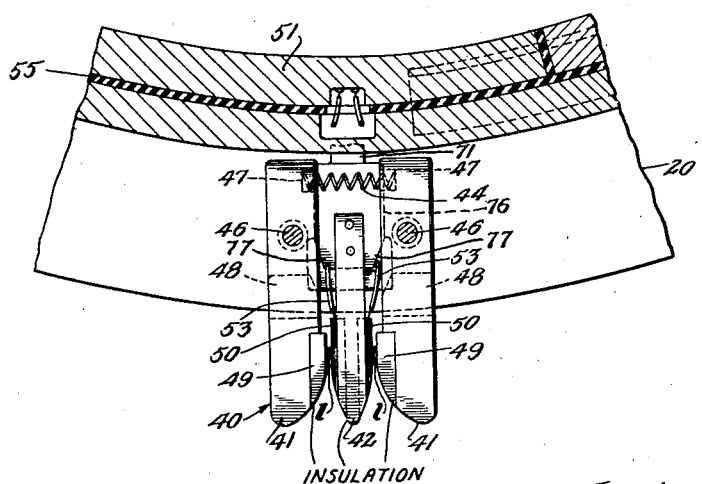
Figure 4:
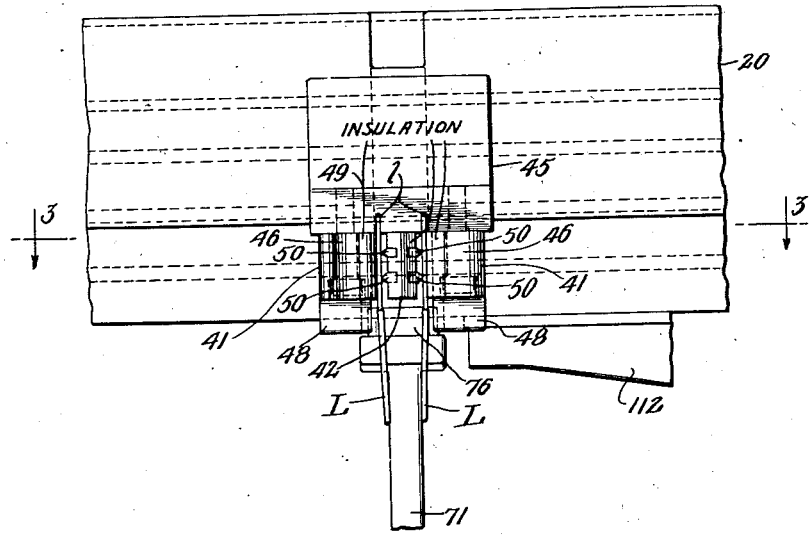

In the drawings, Fig. 1 is a side view of a machine embodying the invention, showing the feeding means or turret conveyor at the top of the machine in vertical section, and also showing one of the frame uprights or columns partly broken away; Fig. 2 is a plan view of the machine with the turret in horizontal section as indicated by the line and arrows 2—2 in Fig. 1, certain parts below the turret being partially broken away; Fig. 3 is a fragmentary plan view of an outer segment of the conveyor turret, on a larger scale than Figs. 1 and 2, and partly in horizontal section as indicated by the line and arrows 3—3 in Fig. 4, showing parts of a gripper device, and with part of an ejector below the gripper shown in dotted lines; and Fig. 4 is a corresponding fragmentary edge view of the turret, affording an end view of the gripper, and showing part of the ejector in full lines.

Figure 5:
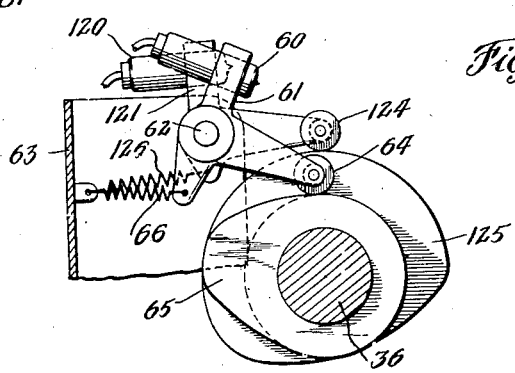

Fig. 5 is a fragmentary side view of certain switches and the cams for operating them, with some of the associated parts in section as indicated by the line and arrows 5—5 in Fig. 2, all on a larger scale than Fig. 2.

Figure 7:
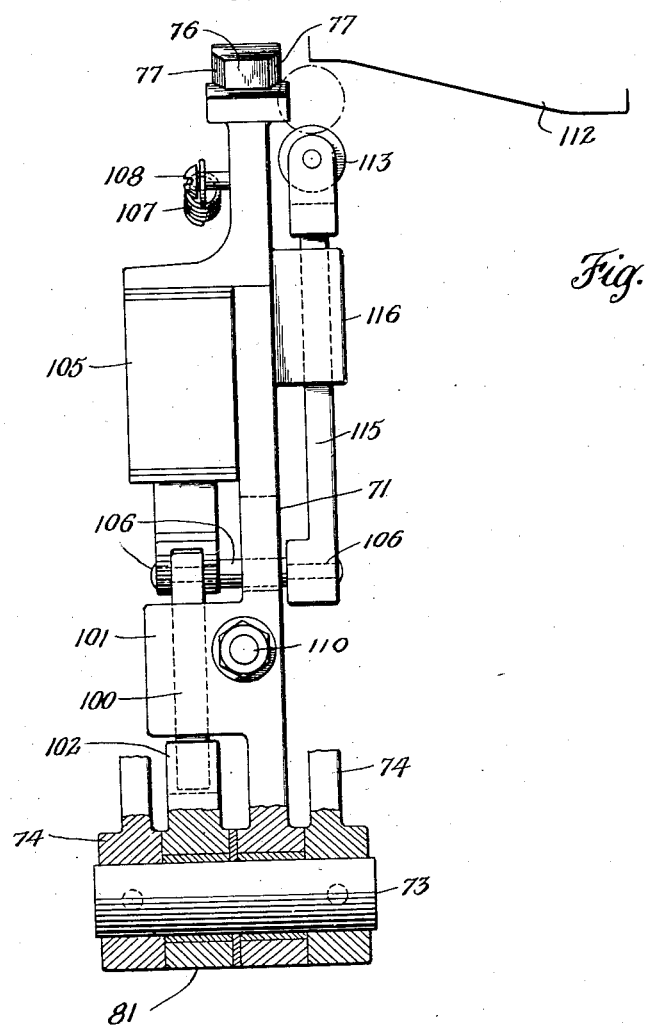
Figure 6:
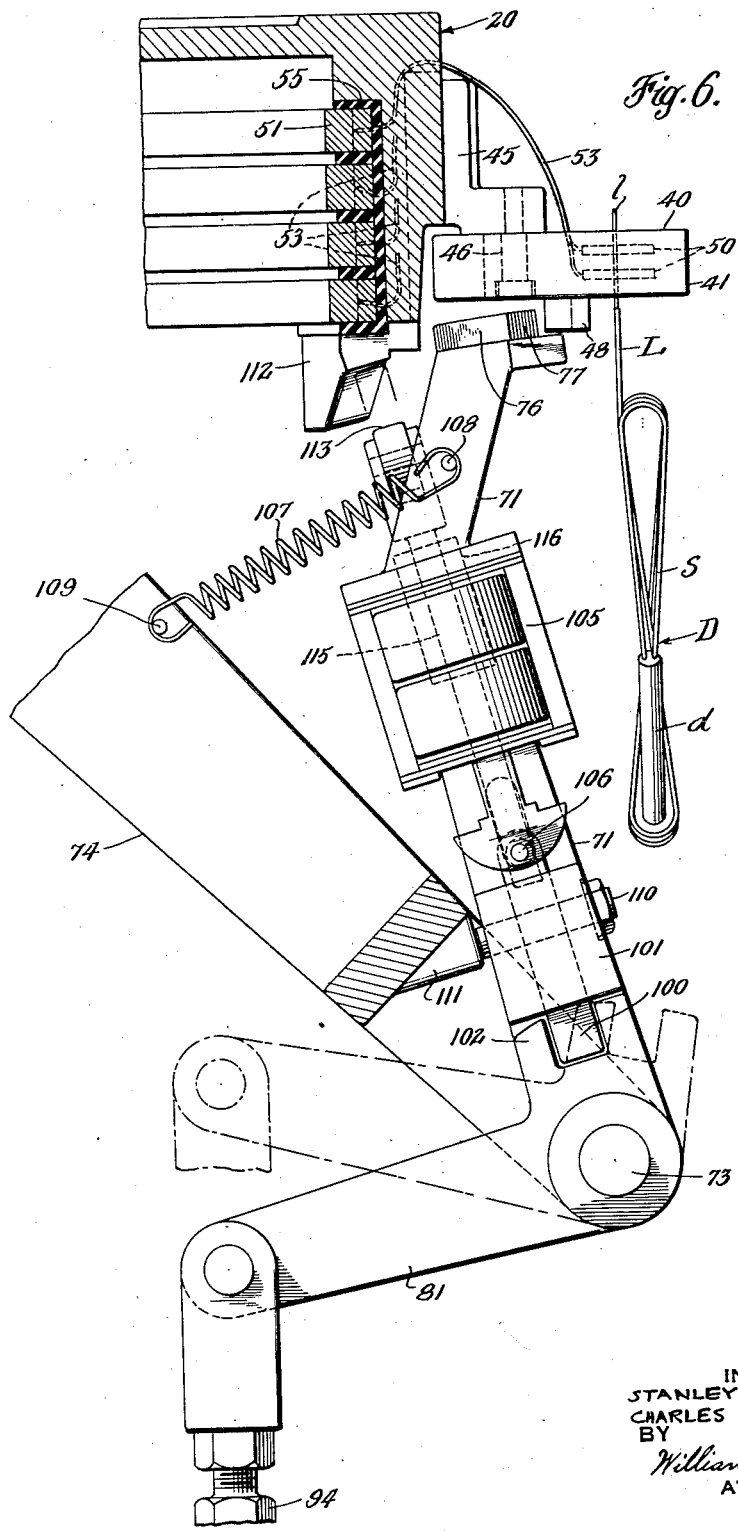

Fig. 6 is a side view of an ejector mechanism for defective devices that have been tested, taken as indicated by the line and arrows 6—6 in Fig. 2, also showing part of the turret rim in section and affording a side view of one of the grippers or clamps for the tested devices, all on a larger scale than Figs. 1 and 2; and Fig. 7 is a view of the ejector mechanism at right angles to Fig. 6, with certain parts broken away and in section, and showing a coacting part that is carried by the turret.

Figure 9:
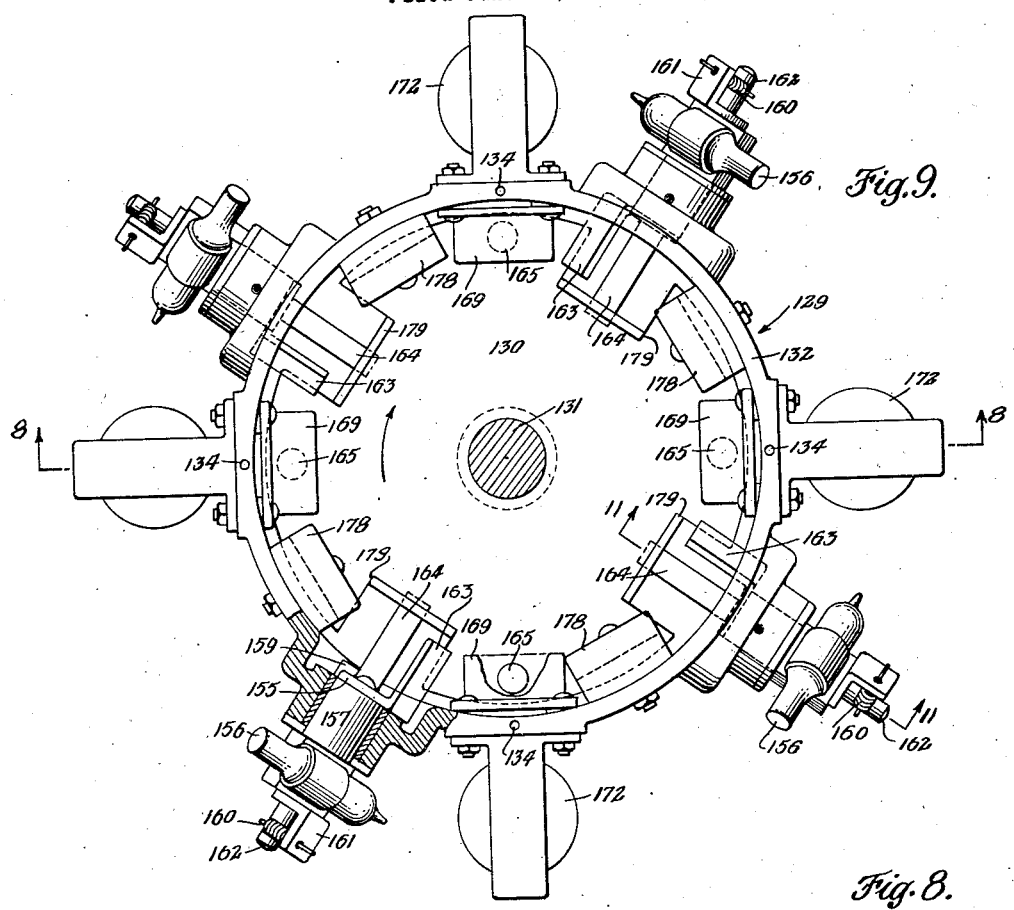
Figure 8:
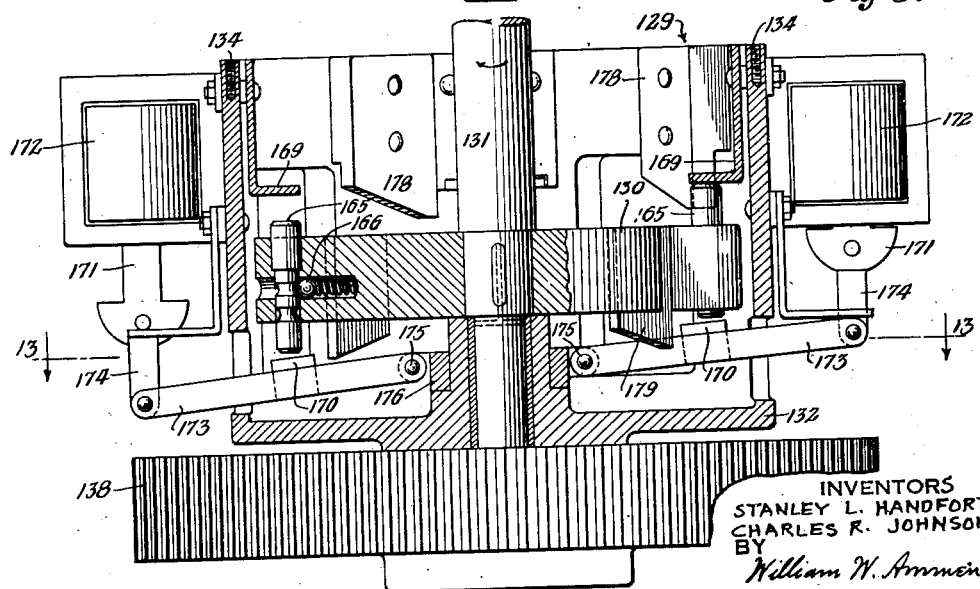

Fig. 8 shows a vertical section through circuit-controlling mechanism of the machine, taken as indicated by the line and arrows 8—8 in Fig. 9; Fig. 9 is a plan view of this same electric controller, certain parts being shown partly broken out and in section; Fig. 10 is a view of one of the switch devices shown in Figs. 8 and 9, from the right of Fig. 11; Fig. 11 is a vertical sectional view illustrating one of these switch devices and mechanism for actuating it, taken as indicated by the line and arrows 11—11 in Figs. 9 and 10, and showing another position of a part in dot-and-dash lines; Fig. 12 is a fragmentary view at right angles to Fig. 11 partly sectional, taken as indicated by the line and arrows 12—12 in Fig. 11, and showing other positions of parts in dot-and-dash lines; and Fig. 13 is a plan view with parts in horizontal section as indicated by the line and arrows 13—13 in Fig. 8.

Figure 15:
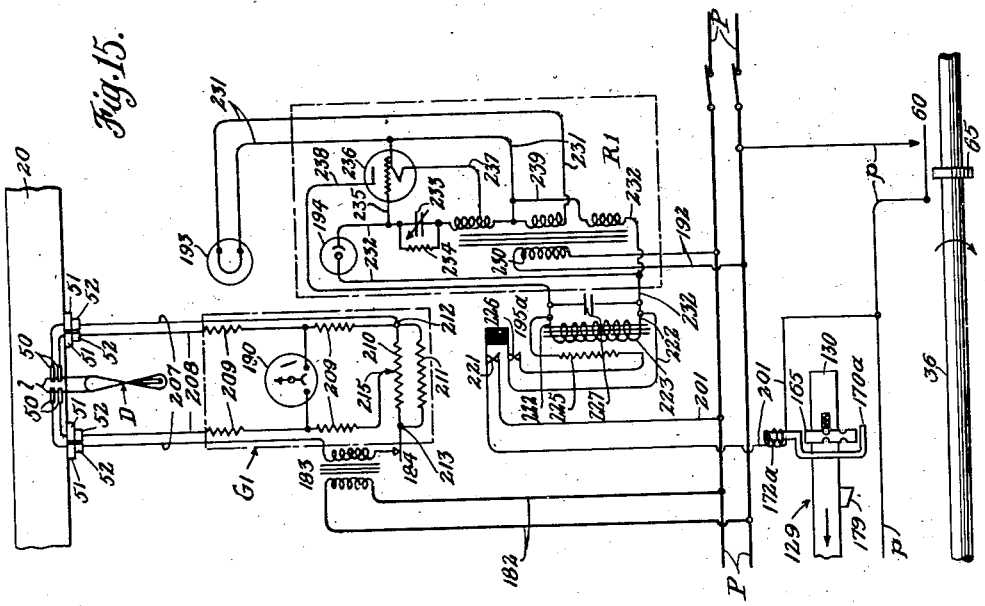
Figure 16:
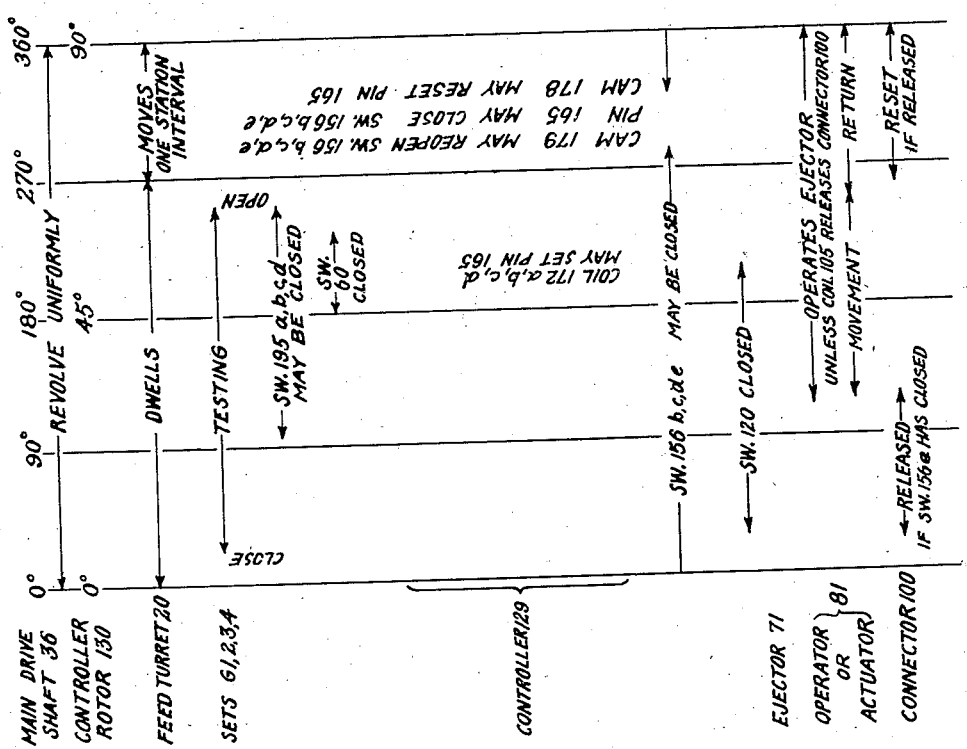

Fig. 14 is a general circuit diagram for the machine, some of its principal mechanical parts being also shown diagrammatically; Fig. 15 is a partial circuit diagram on a larger scale than Fig. 14, showing in detail certain features that are only arbitrarily indicated in Fig. 14; and Fig. 16 is a timing diagram illustrating the sequence of operation of various devices and mechanisms, according to one mode of operation of the machine.

A general idea of the organization of the machine may be obtained from Figs. 1 and 2.

The means here shown for feeding along the devices D to be tested comprises a moving carrier or conveyor in the form of a turret 20 revolving about an upright axis determined by a shaft 21 that is journalled in a hub 22 at the top of the machine frame 23. This frame 23 is shown as comprising a base 24 with upright columns rising therefrom, and a top plate 25 attached to the upper ends of the columns. As shown, the turret 20 has a stepwise movement which is imparted to it from a constantly rotating upright drive shaft 26 through any suitable intermittent drive or indexing mechanism, such as a Geneva movement whose coacting parts 27, 28 are mounted on the upper end of the shaft 26 and on a short stub shaft 29 upstanding from a hub 30 on the frame top 25. The connection from the Geneva movement to the turret 20 may consist of intermeshing toothed gears 31, 32 that are connected to the parts 28, 29, respectively. As here shown, the Geneva movement has a 4:1 reduction, and the gears 31, 32 have a 2:1 reduction, so that the turret 20 makes one revolution for eight revolutions of the drive shaft 26. The shaft 26 may be mounted in bearings in the frame top 25 and in a bracket 33 upstanding from the frame base 24, and may itself be driven through bevel gearing 34, 35 from a horizontal shaft 36 mounted in a bearing on bracket 33 and in a bearing bracket 37 attached to the frame base 24, and driven by any suitable means—such as a constant speed electric motor mounted directly thereon and on the base 24, but not here illustrated.

For supporting the devices D, the turret 20 may be provided with supporting means or carriers at regular intervals around its circumference, such carrier means here shown comprising spring clamps 40 for holding the free ends of the leads L, L, which extend upward from the figure 8 skein S into which the leads are coiled—the blasting caps or detonators $d$ being tucked into the lower loops of the skeins. Thus each skein S and detonator $d$ hang by the leads L, L. As here shown, the carriers 40 are located at 45° intervals around the turret 20, which moves a corresponding angular distance at each step of its movement. At each revolution of the drive shaft 26, therefore, each support and the device D carried thereby moves from one position or station to that previously occupied by the support and device D next ahead of it. Accordingly, there are eight of the supports 40 on the turret 20, and eight stations which they successively traverse, and where they pause or dwell. At the stations marked I, II, III, and IV in Fig. 2, the devices D carried by the supports 40 may be tested; at the station (or stations) just preceding I, devices D to be tested may be placed on or in the carriers 40, as described more fully hereinafter; at the station marked V, devices D whose behavior under test is unsatisfactory may be released or ejected from the machine; and at the station marked VI, satisfactory devices may be released, removed, or ejected.

As best shown in Figs. 2, 3, and 4, each wire-holding clamp 40 is constructed with clamp jaws 41, 42, 41 arranged side by side in generally horizontal positions, and coacting to hold and grip the two leads L, L separately and yieldingly, with an elastic pressure exerted by a helical spring 44. By elastically gripping the wires L, L separately, a proper hold on both of them is assured, regardless of any inequalities or irregularities of wire size. As best shown in Figs. 3 and 4, the mid-jaw 42 extends radially of the carrier 20, is tapered and rounded at its outer or forward end, lies between the leads L, L, and is fixed by rivets to the lower side of a bracket 45 that is attached to the periphery of the turret 20. The outer jaws 41, 41 press the leads L, L against the opposite sides of the jaw 42 and are pivoted at intermediate points in their own length to the bracket 45, by means of bolts or pins 46, 46. The outer or front ends of the jaws 41, 41 are bevelled and rounded away from the jaw 42, and are urged together toward the latter by the helical spring 44, which is shown in Fig. 3 as acting in compression between the rear or inner ends of the jaws, against the bottoms of socket-recesses 47, 47 in which the spring ends are engaged. Thus the openings of the jaws 41, 42, 41 are presented forward or outward around the turret 20, for sidewise insertion and withdrawal of the leads L, L. In front of their pivots 46, 46, the jaws 41, 41 have downward projecting lugs 48, 48, which are oppositely bevelled at their adjacent rear corners, Fig. 3, for a purpose that will appear hereinafter.

In practice, the devices D to be tested may be placed in the carriers 40 at the station(s) just preceding station I by simply forcing the bare ends $l, l$ of their leads L, L sidewise between the clamp jaws 41, 42, 41 as the latter pass or pause at this station. This can be done by hand very easily and conveniently. At the same time, the leads L, L can be inspected to see that they are properly coiled and of exactly the same length, and that their ends $l, l$ (Figs. 1 and 4) are properly stripped of insulation. As here shown, the electrical testing connections for the devices D move with the carrier 20, and are made through means associated with the supporting clamps 40 and engaging the upper ends $l, l$ of the leads L, L of each device D, Fig. 4. Accordingly, the front ends of the jaws 41, 41 of each clamp 40 are shown provided with insulative facings 49, 49 where they engage the bare lead ends $l, l$, and the whole middle jaw 42 is shown as insulative. Contacts 50 for making electrical connection to the lead ends $l, l$ may be inset and secured in the insulative jaw 42. Thus contact connections to the leads L, L are made by the mere act of inserting their bare ends $l, l$ into the clamp 40 which holds and supports the device D during its travel with the carrier turret 20. Accordingly, each carrier clamp 40 with its upper and lower pairs of contacts 50, 50 and 50, 50 also serves as a connector for connecting a device D to a testing circuit of the machine at each of the stations I, II, III, IV, as more fully explained hereinafter.

As shown in Fig. 2, electrical connections to the moving contacts 50 are also made by means of other connectors in the nature of commutator arrangements, comprising annular trackways each consisting of conductive segments 51 and intervening insulative segments mounted around the moving carrier 20, with corresponding contact blocks or "brushes" 52 insulatively mounted on the stationary frame plate 25. For each clamp 40, there is a set of the connector segments 51, and each clamp contact 50 is connected by a lead wire 53 to a segment 51 of the corresponding set. Each connector brush 52 is connected to a corresponding testing circuit lead 54. As shown in Fig. 1, the carrier turret 20 has an inner insulative rim 55 provided with annular grooves in which the several trackways are mounted. Inside the rim 55, Figs. 1 and 2, there is a set of the brush blocks 52 corresponding to each of the testing stations I, II, III, IV, for engaging the conductive trackway segments 51 pertaining to each set of contacts 50 as these segments pass said stations. The brush blocks 52 of each set are shown mounted on horizontally swinging arms 56 (Figs. 2) which are themselves insulatively mounted on a supporting stud 57 upstanding from the plate 25. To assure engagement of the brush blocks 52 with the trackways with adequate contact pressure, they may be spring-pressed against the trackways. As here shown, the brush blocks 52 are arranged to slide in sockets or guides on the ends of the arms 56, and are urged against the trackways by cantilever leaf springs 58 attached to the arms, while the arms are antiturningly secured on the studs 57 by clamping nuts 59 on the upper ends of the studs.

For the purpose of general, over-all control of the energization of certain test-responsive circuits of the machine in proper relation to its mechanical operation, as explained hereinafter, there may be an electric switch 60 of mercury tube type. As shown in Figs. 2 and 5, this switch 60 is mounted in an upstanding arm of a swinging three-armed rocker 61 that is fulcrumed to rock freely on a pivot shaft 62 mounted in a U-shaped part 63 attached to the bearing bracket 37 upstanding from the machine base 24. An approximately horizontal arm of the rocker 61 carries a roller 64 that engages the periphery of a switch-operating edge-cam 65 fixed on the horizontal drive shaft 36, and a lower arm of the rocker 61 is connected to one end of a helical tension spring 66 that is anchored on the part 63 and urges the rocker 61 counterclockwise, thus holding the roller 64 against the cam 65. The circuit connections and functions of the switch 60 will be described hereinafter.

For releasing or ejecting defective devices D at the station V and good devices D at the station VI, there are shown separate ejectors 71 and 72 that move radially of the turret 20, and preferably consist of nearly upright swinging arms pivoted at 73, 73 on brackets 74, 75 attached to the frame top 25, Figs. 1, 2, and 6. As shown in Figs. 1, 3, and 6, each ejector arm 71, 72 has at its upper end a head 76 with a flat front face for engaging against the corresponding leads L, L of a device D and pushing them outward out of the clamp 40 when the arm 71, 72 swings outward. A little before the head 76 strikes the leads L, L, its oppositely bevelled sides 77, 77 engage between the bevels of the lugs 48, 48 on the jaws 41, 41 and open the clamp 40. Thus the device D is released and swept outward from the clamp 40 to drop into any receptacle or other receiving means (not shown) suitably located to receive it.

The ejector arms 71 and 72 may be actuated by coacting arms 81 and 82 that also swing about the pivots 73, 73, and may extend inward from these pivots. As shown in Fig. 6, the ejector arm 71 for defective devices D and its actuator 81 are separate parts pivoted side by side on the pivot 73, in the forked end of the bracket 74, but are temporarily connected together to move as a single bellcrank when there is a defective D to be ejected, as explained hereinafter. On the other hand, the ejector arm 72 for good devices D and its actuator 82 may be integrally united, so that they always form a single bell-crank, as shown in Fig. 1. Both ejectors 71, 72 may conveniently be operated by a single cam 85 fast on the horizontal shaft 36 and having a lateral groove in which is engaged a roller 86 rotatably mounted on the side of a vertically swinging lever 87 fulcrumed or pivoted at 88 on a bracket 89 attached to the frame base 24, and having its free end connected by a link 90 to a slide or crossheads 91 movable up and down along upright guideways 92, 93 on the frame 23. The crosshead 91 is shown connected by link-rods 94, 95 (Figs. 1 and 6) to the free inner ends of the ejector actuators 81, 82, which thus swing up and down together at each revolution of the shaft 36. The link rods 94, 95 may be of turnbuckle type, and thus adjustable in length to permit independent adjustment of the limits of swing of the two actuators 81, 82. As the shaft 36 like the shaft 26 makes one revolution for each one-eighth turn of the turret 20 that shifts a carrier 40 from one station to the next, it will be seen that each actuator 81, 82 is operated by the cam 85 when each clamp is in line with its ejector 71, 72 at the corresponding station V or VI. In Fig. 6, one extreme position or limit of movement of the actuator arm 81 for the defective-device ejector 71 is shown in full lines, and the other extreme position is shown in dot-and-dash-lines; and similarly for the good-device ejector 72 in Fig. 1.

The provisions for operatively connecting and disconnecting the ejector 71 for defective devices D and its actuator 81 are shown in Figs. 6 and 7 as of a latch-like type, comprising a bolt 100 slidable lengthwise in a guideway bore of a lateral projection 101 on the arm 71, and engaging at its inner end in a socket notch of a lateral projection 102 on the pivot hub of the actuating arm 81. For moving the bolt 100 lengthwise of the arm 71, there is an operator in the form of a solenoid or electromagnet coil 105 mounted on one side of the arm 71 and having its core pivoted to the outer end of the bolt by means of a transverse member 106. As here shown, the solenoid 105 acts only to withdraw the bolt 100 from engagement with the actuator 81, so that the actuator 81 always operates the ejector 71 unless the solenoid is energized; and hence the result of any misfunctioning as regards energization of the solenoid 105 is on the side of safety as against failure to eject a defective device D. For holding the ejector arm 71 at the inner limit or extreme of its movement (or returning it to that position) when it is disconnected from the actuator 81, there is shown a helical tension spring 107 connected between an anchorage pin 108 on the arm 71 and a similar pin 109 on the bracket 74. The extreme inner position of the ejector 71 may be determined by adjustable stop means such as a screw 110 taking through the arm 71 and engaging against a stop shoulder 111 on the bracket 74.

For positively "resetting" or reengaging the bolt 100 after its withdrawal by the solenoid 105 as above described, mechanical actuating means may be provided, here shown as a sloping crown-cam segment 112 mounted on the lower edge of the carrier 20 in proper relation to each support 40, Figs. 6 and 7. As each support 40 moves from station V to station VI, the corresponding cam 112 engages and pushes against a roller 113 at the outer end of a rod 115 that is slidably mounted in the guideway bore of a lateral projection 116 on the arm 71 and is pivotally connected at its inner end to the bolt 100, by means of the transverse member 106. Thus the bolt 100 is reset after each withdrawal by the solenoid 105, so that the actuator 81 can operate the ejector 71 for the succeeding device D if necessary. This resetting occurs, of course, when the ejector arm 71 and the actuator arm 81 are in the proper angular relation to one another, as shown in full lines in Fig. 6.

For controlling the energization of the solenoid 105 and the action of the ejector 71 according to the behavior of devices D under test, as explained hereinafter, there may be an electric switch 120 of mercury tube type. As shown in Figs. 2 and 5, this switch 120 is mounted in an upstanding arm of a swinging three-armed rocker 121 that is similar to the rocker 61 above described, and is fulcrumed to rock freely (and independently of the rocker 61) on the pivot shaft 62. The roller 124 on the horizontal arm of the rocker 121 engages the periphery of a separate switch-operating edge-cam 125 fixed on the horizontal drive shaft 36, and is held against the cam by the clockwise action of a spring 126, all substantially as in the case of the rocker 61 and the cam 65. The circuit connections and functions of the switch 120 will be described hereinafter.

Besides the switches 60 and 120 already described, there is shown in Figs. 1, 2, 8, and 9 a circuit-controller or commutator 129 having a rotor 130 whose upright shaft 131 may be driven from the main drive shaft 36 through the upright shaft 26, and with which may be associated an enclosing frame structure or casing 132 having a detachable top cover 133. Tapped holes 134 are shown in the upper edge of the casing 132 in Figs. 8 and 9 for cover-securing screws (not shown). The casing 132 may be supported by means of a bracket 135 attached to a pedestal 136 that is mounted on the base 24 and affords bearing for the shaft 131. As shown in Figs. 1, 2, and 8, the driving connection from shaft 26 to shaft 131 comprises toothed gears 137, 138 and an interposed idler pinion 139 on a short upright shaft 140 that is mounted in the bracket 33. The gear ratio of this gear train 137—139—138 may be 4 to 1, so that the controller rotor 130 makes one-fourth revolution for each revolution of shafts 36 and 26, and for each feed-movement of turret 20 that carries a device D from one of the stations I, II, III, IV, V, VI to the next station. Owing to the interposition of the idler 139, the controller rotor 130 turns in the same direction as the turret 20, though with a uniform rotation instead of a stepwise movement like that of the turret.

As above indicated, and as shown in Figs. 8 and 9, the controller or commutator 129 comprises a rotor 130 which moves in a definite correlation with the motion of the shafts 26 and 36 (and with the movements of the feed means 20) and carries certain parts, as well as an associated stationary frame structure or casing 132 supporting certain other parts. With the driving connections above described, the carrier rotor 130 makes ¼ revolution each time the feed-means 20 and its carriers 40 move the distance from one testing station I, II, III, IV to another. Adjacent the outer margin of the carrier 130, there are stationed rocker actuators 155 for oscillatory make-and-break switches 156 (shown in Figs. 9–11 as of mercury-tube type), each actuator 155 being mounted on the inner end of a shaft-axis 157 which extends through a bearing in the wall of the casing 132 and carries the mercury tube switch device on an upstanding arm 158. The range of oscillation of each switch 156 may be limited by any suitable means, such as stop pins 159, 159 projecting inward from the wall of the casing 132, in position to engage the actuator 155 above and below its axis, Figs. 10 and 12. Means are preferably provided for giving each switch 156 a snap action, such as a helical tension spring 160 connected between the end of a crank-arm 161 on the shaft 157 and an anchorage 162 projecting from the casing 132, in such relation to the crank-arm 161 that the spring swings past a dead-center during the movement of the switch that is permitted by the stops 159, 159.

As best shown in Figs. 11 and 12, each actuator 155 has actuating arms 163, 164 at opposite sides of its axis and of the carrier 130, in position to engage the bevel-edged (upper and lower) ends of actuating members or pins 165 that are mounted in axially-extending guideways or bores in the carrier 130, near its periphery. The vertical positions of each actuating pin 165 in its guideway may be fixed by suitable locking or detent means, shown as a spring-pressed ball 166 mounted in a bore in the carrier 130 and coacting alternatively with upper and lower recesses or annular grooves in the pin. The upper end of the pin 165 and its guide-bore are shown enlarged, so that the corresponding shoulders of pin and carrier limit downward movement of the pin, while its upward movement may be limited by an inward-extending stop lug 169 on the casing 132, Fig. 9.

From an examination of Figs. 8, 11, and 12, it will be seen that a pin 165 in its lower full line position of these figures can pass an actuator 155 without engaging either of its arms 163, 164 when the actuator 155 and its switch 156 are in their full-line, open-circuit positions; but that if the switch and actuator are in the closed-circuit positions corresponding to the dot-and-dash showing of the actuator in Fig. 12, the lower end of the pin 165 will strike the lower actuator arm 164 and swing the actuator and switch to their full-line, open-circuit positions. On the other hand, a pin 165 in its upper, dot-and-dash position of Figs. 11 and 12 can pass the actuator 155 without engaging either of its arms 163, 164 when the actuator and its switch are in the closed-circuit positions corresponding to the dot-and-dash showing of the actuator in Fig. 12; but if the switch and actuator are in the open-circuit positions shown in full lines in Figs. 10 and 11, the upper end of the pin 165 will strike the upper actuator arm 163 and swing the actuator and switch to their closed-circuit positions, indicated by the dot-and-dash showing of the actuator in Fig. 12.

For raising each pin 165 to its upper position in Figs. 8, 11, and 12, there is a pusher and slide member 170 operatively connected to the armature or core piece 171 of an electro-magnet or solenoid coil 172. As shown in Figs. 8, 9, and 13, the solenoids 172 are mounted at 90° intervals around the outside of the casing 132, and the members 170 are mounted on double levers 173 whose outer ends are connected to the solenoid cores 171 by links 174, while their inner ends are fulcrumed or pivoted at 175 on a collar 176 that is mounted around a central boss of the casing 132, that affords bearing for the rotor shaft 131. For depressing the pins 165, there are stationary inclined crown-cams 178 above their path of travel, mounted on the inside of the casing 132, each cam between an actuator 155 and the succeeding pusher 170; so that after a pin 165 raised by one pusher 170 passes the next actuator 155, it is depressed by the succeeding cam 178 before reaching any succeeding part of the mechanism 129. Similar inclined crown-cams 179 are also shown on the carrier 130 between its pins 165, for engaging each lever 173 to depress its pusher 170 and core 171 after the pusher 170 has acted on a pin 165—provided, that is, these parts 170, 171 do not drop by gravity as soon as the coil 172 which raised them is deenergized.

It will be seen, therefore, that as long as the pins 165 remain in their lower, full-line positions, all the switches 156 will remain open; that whenever a solenoid or coil 172 is energized, its corresponding pusher 170 will raise the pin 165 that is then over this pusher, so that the pin will act on the first actuator 155 that it encounters to close the corresponding switch 156; that this pin 165 will then be depressed by the next stationary cam 178 in its path, before reaching another switch-actuator 155; and that the switch 156 that has been closed as just described will be opened by the succeeding cam 179 of carrier 130 before the succeeding pin 165 reaches its actuator 155.

The electric circuit connections of the switches 156 and solenoids 172 will be explained hereinafter, as well as the functions of the switches and the purposes and results of thus closing and reopening them.

Figs. 14 and 15 are wiring diagrams illustrating an electrical testing and sorting or rejection control system and its coordination with the feed of devices along the series of testing and rejection stations I, II, III, IV, V by the feed-means 20 and its carriers 40, etc. Principal mechanical features of the machine illustrated in Figs. 1 to 8 are diagrammatically represented in Figs. 14 and 15, some of them rearranged or in simplified mechanical forms, which in certain instances differ greatly from the forms shown in Figs. 1–8. For example, the feed means or turret 20 is shown with a great part of its circumference unrolled into the plane of the paper; the relative positions of the parts 34, 65, 85, 125 on the shaft 36 are different; the gears 137, 138, 139 are in different positions relative to the observer from Fig. 1; and the controller casing 132 is omitted and the carrier 130 is arbitrarily illustrated as if its whole outer circumferential margin were unrolled into parallelism with the plane of the paper, like the carrier turret 20, since it might, indeed, even be embodied in this turret. While Figs. 1, 2, and 14 show the controller carrier 130 as driven from the drive shaft 26 in a uniform manner, through a mere reduction gearing, this need not necessarily be the case, since all that is necessary is for the controller 129 to operate the auxiliary switches 156 in due correlation with the movement of the feed means 20 and the devices D. In general, the correspondence of various parts and features in Figs. 14 and 15 to those in Figs. 1–8 is indicated by use of the same reference numerals for homologous parts in all these figures.

As a matter of convenience in comprehensive small-scale diagrammatic representation, certain parts of the testing and control system (hereinafter referred to as "test sets" and "controls") are collectively and more or less arbitrarily represented in Fig. 14 by dot-and-dash rectangles G1, etc., and R1, etc.—the parts forming the testing set G1 and the control R1 being, however, illustrated in detail in Fig. 15, within the dot-and-dash rectangles there designated G1 and R1. As shown in Fig. 14, there are corresponding test sets G1, G2, G3, G4 and controls R1, R2, R3, R4 for the several testing stations I, II, III, IV. The principal functions of the system represented in Fig. 14 in the operation of the machine may be preliminarily outlined as follows:

During the pauses of the devices D at the stations I, II, III, IV, testing power or voltage is applied to them, and the results of these tests may be indicated. This is done by the test sets G1, G2, G3, G4, which may include testing circuits suitably connected to the contacts 50, 50 and 50, 50 and may be supplied with power from any suitable source, such as a 110 volt 60 cycle A. C. circuit P—all as more fully explained hereinafter.

The action of the ejector 71 is controlled and determined according to the behavior of the devices D under test at the stations I, II, III, IV. This is done by the test sets G1, G2, G3, G4 acting through the controls R1, R2, R3, R4 (which may also be energized from the circuit P), and through certain connections and mechanisms interposed between these controls and the ejector 71. In response to the behavior of a device D when tested at the stations I, II, III, IV, the control means determines the operative connection or disconnection of the ejector actuator 81 to or from the ejector 71 when said device D subsequently reaches the ejection station V.

Failure or unfavorable behavior of a device D under test at any one of the stations I, II, III, IV determines and assures its segregation or rejection at the station V, regardless of the behavior of said device when tested at any other station. To accomplish this through a single ejector mechanism, a rejective determination by any of the test sets G1, G2, G3, G4 acting through the corresponding control R1, R2, R3, R4 is made predominantly effective on the ejector 71 through the action of the controller 129, which is operatively interposed between the several controls R1, R2, R3, R4 and the ejector 71.

The power supply circuit P from which the testing and control system receives energy is here shown with a supply branch p connected thereto through the interposed switch 60 as a master control switch. This switch 60 may be suitably opened and closed during each revolution of the drive shaft 36, preferably during the pauses of the feed means 20, as already explained in connection with Figs. 2 and 5. The testing set G1 (and the other testing sets are essentially similar) is shown as connected to the power circuit P through a supply branch 182, a step-down transformer 183, and a rectifier 184; as connected to the double pairs of testing contact-terminals 50, 50 and 50, 50; and as including a current responsive device such as a galvanometer 190, which may be provided with a movable mirror 191. The responsive control R1 (and the other controls R2, R3, R4 are similar) is shown as connected to the power circuit P through a supply branch 192; as provided with a light-source 193 (such as an incandescent electric lamp) arranged to shine on the galvanometer mirror 191 of test set G1; as including a light-sensitive device such as an "electric eye" or photoelectric cell 194; and as also including a controlling relay-switch 195. These particular testing sets and controls G1, etc., and R1, etc., are more fully described hereinafter; but it will of course be understood that in practice they may be replaced by various types of electronic or electromagnetic testing and control apparatus—or, indeed, by any means capable of controlling energization of the circuits 201, 202, 203, 204 according to the current flow through the devices D under test at the stations I, II, III, IV. While the several switches 195 are individually distinguished in Fig. 14 by added letters a, b, c, and d, these are disregarded in the following general description—though used later on in the detailed explanation of the operation of the system.

The responsive controls R1, R2, R3, R4 control parallel auxiliary circuits 201, 202, 203, 204 that correspond to the several devices D at the stations I, II, III, IV, and extend through the respective control switches 195 from one side of the power supply circuit P to the branch supply circuit p, which is connected to the other side of said circuit P through master switch 60. Thus the absence or the flow of current through the devices D under the test voltage applied to them at the several stations I, II, III, IV not only indicates the resistances of the devices D at these stations on the corresponding galvanometers 190, but is effective (through the corresponding testing sets and controls G1, R1, etc.) to control the energization of the corresponding auxiliary branch circuits 201, 202, 203, 204, respectively. For the operating control of the ejector 71, an actuating branch circuit 205 is connected in parallel with the circuits p and 201, 202, 203, 204 between the two sides of the power circuit P, but independent of the switch 60. This actuating branch circuit 205 includes the ejector-controlling coil or solenoid 185, and its energization is timed in correlation with the shaft 36 and with the rest of the machine by the switch 120 acting as a master switch. The switch 120 may be suitably opened and closed (like the switch 60) during each revolution of the drive shaft 36, preferably during the pauses of the feed means 20—as already explained in connection with Figs. 2 and 6.

As shown in Fig. 14, the switches 156 of the controller 129, hereinafter generally distinguished as "auxiliary" switches, are connected in the circuits 202, 203, 204, 205. The action of any of the test sets and controls G1, etc., and R1 etc., in response to the behavior of a device D under test at any of the stations I, II, III, IV directly controls energization of the corresponding auxiliary branch circuit 201, 202, 203, or 204, which results from closure of the corresponding relay switch 195. From Fig. 14 and the preceding description of the controller 129 in connection with Figs. 8–13, it will be seen that energization of one of the series of auxiliary branch circuits 201, 202, 203, 204 would result in raising and rendering active the corresponding actuating member 165, which would then presently close the auxiliary switch 156 that it next reached in its rotary movement with carrier 130; but that energization of any of the branch circuits 202, 203, 204, 205 is impossible unless all preceding circuits of the series have been energized, starting with the circuit 201—which alone can be energized solely as a result of closure of its control switch 195, independently of all other controls (except the master switch 60). Only, therefore, if the actuating member 165 of the controller 129 corresponding to a device being tested is rendered active to operate and close all its switches 156 as a result of closure of all the switches 195 by favorable behavior of a device D under test at all the stations I, II, III, IV is the branch circuit 205 and its solenoid 105 energized, thus withdrawing latch 100 and disconnecting actuator 81 from ejector 71, so that the latter does not reject the corresponding device D from the feed means 20 when said device reaches station V.

As the testing sets G1, G2, G3, G4 and the controls R1, R2, R3, R4 may be essentially alike for all of the testing stations I, II, III, IV, a description of the station I testing sets and controls G1 and R1 will suffice.

As shown in Fig. 15, the testing circuit of the test set G1 comprises a bridge-circuit across which the galvanometer 190 is connected. In order to minimize the effect on the galvanometer 190 of the possibly irregular contact resistances between the leads l, l and the contact terminals of the set G1, the testing circuit is preferably a double bridge-circuit of the Kelvin type. The pairs of contact terminals 50, 50 and 50, 50 are connected to the outer and inner bridge circuit loops 207 and 208, respectively; the external power supply connection comprising the rectifier 184 and the secondary of transformer 183 (in series with one another) is connected in the outer loop 207; and the galvanometer 190 is connected only across the inner loop 208—which as shown also includes substantial fixed resistances 209 (whose values may preferably be equal, and of the order of 100 ohms, for example) in its four legs. The outer loop 207 includes an (adjustable) resistance 210, which in practice may conveniently be shunted with a parallel calibrating resistance 211, connected to the loop 207 at 212 and 213. The two loops 207 and 208 are interconnected at 212 and at 215 in such a way that the inner loop 208 also includes the resistance 210, or such portion thereof as may be determined by the adjustment of the slide-wire connection 215 along this resistance 210. The loops 207, 208 are also generally interconnected, of course, through the leads l, l and the device D under test, by means of the contact terminals 50, 50 and 50, 50: i. e., the device D is normally connected across both the loops.

With the bridge circuit arrangement and connections above described, and with any given adjustment of the slide-wire connection 215 along the resistance 210, the current flow in the loop circuit 208 is naturally a small proportion of that in the loop circuit 207, which is essentially determined by the resistance of this circuit 207. The contact resistances at 50, 50 are so small as compared with the resistances 209 in circuit 208 that variations in these contact resistances cannot affect the galvanometer 190 materially; and so (practically) the galvanometer responds to and measures the ratio between the active part of the slide-wire resistance 210 and the resistance of the device D.

As a safeguard against accidental explosion of detonators D under test, the transformer 183 through which the loop circuit 207 is energized may be designed with such impedance that it can only deliver a current of safely limited value, no matter how low may be the effective resistance of the circuit 207 across the terminals of the transformer secondary.

The responsive control R1 is shown in Fig. 15 as comprising the (self-opening, D. C.) relay switch 195 (already mentioned), whose main contacts 221, 221 make and break the circuit 201 when the circuit 222 of the coil of electromagnet 223 is energized and de-energized. When the main switch contacts 221, 221 close, a resistance 225 may preferably be shunted across the circuit 222 in parallel with the electromagnet 223, by means of auxiliary switch contacts 226, 226 (operated by said electromagnet 223 to make and break concurrently with the main contacts), in order to reduce the holding current in the electromagnet 223 and thus allow the main switch contacts to reopen under a current only moderately less than that which caused them to close. A capacity 227 such as a condenser is shown connected in shunt across the circuit 222, to prevent burning of the switch contacts 226, 226 by arcing between them.

The control R1 is energized from the power supply circuit P through the branch circuit 192 and a transformer 230 whose primary is connected into the latter. As here shown, the electric lamp 193 which shines on the galvanometer mirror 191 of control R1 receives current through a circuit 231 tapped into the secondary of the transformer 230. The electric eye 194 is connected across the secondary of the transformer 230 by a circuit 232 in one side of which is included a variable (adjustable) capacity or condenser 233, shunted by a resistance 234. The electric eye 194 also has a connection 235 (from its circuit 232, between the eye and the parts 233, 234) to the grid of a vacuum tube amplifier and rectifier 236. The cathode of the tube 236 receives heating current by means of taps to the secondary of the transformer 230, including connections already mentioned and a lead 237. The plate of the tube 236 is connected by a lead 238 to one side of the circuit 222 and thus to the coil 223 of the relay switch 195 of the control R1; and from this coil 223 and the other side of circuit 222, there is a connection through circuit 232, part of the secondary of transformer 230, lead 239, and part of circuit 231 to the cathode of tube 236. The grid of tube 236 is connected through condenser 233 and grid leak 234 to one side of the secondary of transformer 230, and is connected through the electric eye circuit 232 and the circuit 222 (including coil 223) to the other side of this transformer secondary.

For convenience in explaining the testing operation and the action of the commutator 129, certain stationary parts are individually distinguished in Figs. 14 and 15 by the addition of letters $a$, $b$, $c$, $d$, or $e$ to their reference numerals, according to the circuit 201, 202, 203, 204, or 205 to which each of them pertains—though such letters are omitted from Figs. 8–13 and from the preceding description, because such individual distinction of coordinate parts would hitherto have been confusing rather than helpful. Fig. 16 shows the time sequences and correlations in the operation of the mechanisms of the machine, and may be found helpful in understanding its action.

A mode of operation of the machine and of the testing system may now be explained with special reference to Figs. 1, 14, 15, and 16:

Devices D may be placed on the supports 40 of the feed means 20 at any desired point of their travel in advance of the station I and in any suitable manner; and they are fed along by the movement of said feed means, pausing at each of the stations I, II, III, IV, V. Concurrently, the commutator 129 makes a quarter-turn for each movement of a device D from one station to the next, and the switches 60 and 120 and the ejector actuator 81 are operated once during each pause of the feed means 20. With the connector or latch 100 arranged to operate as shown in Figs. 6, 7 and 14, each device D reaching station V will be removed from the carrier 40 and rejected unless the ejector 71 and the actuator 81 are disconnected from one another, by action of coil 105 on connector latch 100, in each and every instance.

During the pause of each device D at each of the testing stations I, II, III, IV, it is connected to the corresponding testing unit G1, G2, G3, or G4, and is thus subjected to the testing voltage from the secondary of transformer 183, causing a corresponding flow of current through the device D (if its internal circuit is uninterrupted) and through galvanometer 190. A beam of light from lamp 193 is constantly shining on the galvanometer mirror 191; but preferably the galvanometer 190 is so calibrated that the reflected light beam does not strike the electric eye 194 unless (1) the galvanometer deflects from its normal position, nor unless (2) its deflection corresponds to an impedance for the device D that meets the chosen test-criterion of station I. The switch 60 is held closed by cam 65 long enough for the unit R1, R2, R3, or R4 and the commutator 129 to respond as hereinafter described when the light beam does strike the electric eye 194.

If a device D does not pass the test at station I, so that the reflected light from mirror 191 does not strike electric eye 194, the responsive control R1 is not brought into action; control switch 195a of station I is not closed; circuit 201 and coil 172a are not energized; and the corresponding actuating pin 165 in Figs. 14 and 15 is not raised, but allowed to remain in its lower position, as shown. During the subsequent quarter-turn of commutator rotor 130 and the corresponding movement of the defective device D (that has thus failed) from station I to station II, therefore, this pin 165 passes switch 156b without closing it, so that circuit 202 remains open. Accordingly, while the ensuing test of this defective device D at station II does, indeed, take place, and its result is visibly indicated by the galvanometer 190 of the testing set G2, it is rendered nugatory as regards the action of the machine with respect to this device at station V, because coil 172b cannot possibly be energized to raise the pin 165: i. e., failure of the device D to pass the test at station I automatically entails or predetermines a virtual failure to pass at station II, regardless of subsequent tests. This, similarly, automatically entails or predetermines failure of this device D to pass at station III, regardless of subsequent tests, and at station IV. In other words, separation-determining action of the determining means for any of the stations I, II, III, IV dominates and controls the action of all the succeeding determining means.

If a device D does pass the test at station I, the reflected light from mirror 191 does strike electric eye 194, which allows current to pass through tube 236, thus bringing control R1 into action to actuate and close control switch 195a of station I, energizing circuit 201 and coil 172a to raise the corresponding actuating pin 165 to the dot-and-dash position of Figs. 11 and 12, thus rendering it active. During the subsequent quarter-turn of commutator 130 and the corresponding movement of the device D from station I to station II, this pin 165 strikes actuator 155b and closes switch 156b, thus putting the energization of circuit 202 and coil 172b and the raising of the pin 165 under the control of relay switch 195b of station II when the device D that has passed the test at station I comes under test at station II. If this same device D fails to pass when thus tested at station II, its failure at stations III and IV ensues automatically, just as before; but if it passes the test at station II, it has the opportunity of also passing at stations III and IV.

When a device D fails to pass at station IV—whether directly, by failing to bring the control R4 into action, or indirectly, as a consequence of having failed at one of the stations I, II, III—circuit 204 and coil 172d are not energized, the pin 165 is not raised, switch 156e is not closed when the pin 165 passes it, and the subsequent closure of switch 120 during the pause of the defective device D in question at station V fails to energize circuit 205 and coil 105. Accordingly, the ejector 71 and its actuator or operator 81 remain connected together by connector 100 during the oscillation of actuator 81, so that ejector 71 is operated to release or pull off the defective device D from the carrier 40 at station V.

On the other hand, when a device D does pass the tests at all the stations I, II, III, IV, the control R4 energizes circuit 204 and coil 172d, raising the pin 165, and thus bringing about subsequent closure of switch 156e and energization of circuit 205 and coil 105. This causes disengagement of connector 100, and disconnects from one another ejector 71 and ejector operator 81; so that ejector 71 is not operated, and the good device D is allowed to travel on past station V—for subsequent removal or discharge at any desired point and in any desired manner, as at station VI by ejector 72.

It will be understood that while one device D is undergoing its initial test at station I, the device D that precedes it in the machine is at station II undergoing its second test, another device D is at station III undergoing its third test, still another at station IV undergoing its fourth test, and yet another (which has already been tested at all four stations I, II, III, IV) is at station V—where it is rejected if it has failed in any of its tests. The switches 156b, c, d of the controller 129 are definitely and fixedly appropriated to the respective stations II, III, IV by their circuit connections 202, 203, 204, etc.; but each pin 165 coacts successively with the several actuators 155b, c, d, e of these several switches. Functionally, on the other hand, each pin 165 follows a given device D through the machine from station to station—just as if this pin were actually a part of the carrier 40 on which such device D traverses the stations I, II, III, IV, V. The switch 60 operating as already described (and as shown on the timing chart which is Fig. 16) serves to correlate or time the energization of the circuits 201, 202, 203, 204 and the setting of the pins 165 with the rotary movement of the controller rotor 130 and the pins in relation to the switch actuators 155b, c, d, e and the fixed cams 178. The switch 120 operating as described is helpful for correlating or timing the energization of the circuit 205 and the release of connector 109 with the operation of the ejector actuator 81.

The testing sets G1, G2, G3, G4 may be calibrated and arranged to produce any combination or sequence of tests desired. In connection with automatic ejection of defective devices D through the use of light-beams and light-responsive controls R1, R2, R3, R4, the galvanometers 190 of the testing sets G1 and G2 may be so adjusted and the polarities so chosen that the reflected light-beams only strike the electric eyes 194 of the controls R1 and R2 when the electrical impedance or resistance of the device D is not above an allowable maximum, while the galvanometers 190 of the testing sets G3 and G4 may be so set and the polarities so chosen (i. e., reversed as compared with those affecting the testing sets G1 and G2) that the reflected light-beams only strike the electric eyes 194 of the controls R3 and R4 when the impedance or resistance of the device D is not below an allowable minimum. Under these conditions, devices D that pass the tests at stations I, II, III, IV and hence are not rejected at station V will have an impedance between the allowable upper and lower limits.

Preferably, the testing circuit connections to the contact terminals 50, 50 and 50, 50 at station II may be reversed as compared with station I: e. g., Fig. 14 shows the right-hand contact terminals 50, 50 connected to the right-hand sides of the outer and inner loops 207, 208, and the left-hand contacts 50, 50 connected to the left-hand sides of said outer and inner loops at station I; while at station II the right-hand contacts 50, 50 are connected to the left-hand sides of the inner and outer loops, and the left-hand contacts 50, 50 are connected to the right-hand sides of the outer and inner loops. Accordingly, the D. C. current flow through the device D and through the contacts 50, 50 is reversed at station II as compared with that at station I; and the inner loop connections (which affect the galvanometer 190) are between upper and lower contacts 50, 50 at station II, instead of between lower contacts 50, 50 as at station I. As shown in Fig. 14, the connections of the contact terminals at stations III and IV are like those at stations I and II, respectively—in other words, the testing circuit connections are reversed for the successive sets of contact terminals throughout the entire series of stations I, II, III, IV. Such reversal of testing circuit connections to the contacts of successive sets tends to obviate acceptance of a faulty device D owing to erroneous test results due to contact resistance. This is because the reversal of connections has the effect of shifting the bad contact resistance from one side of the measuring circuit 208 to the other side thereof, thus reversing the direction of any current flow through the galvanometer 190 that may result from unbalancing of circuit 208 owing to the contact resistance. Generally speaking, a bad contact at 50 is due to a lead wire Z that is dirty, or imperfectly stripped of insulation, or bent so that it is not properly gripped against one of the contacts 50.

As shown in Fig. 14, the action of the rectifiers 184 is reversed at stations III and IV as compared with stations I and II, to give the reversal of polarity required for low impedance testing at stations III and IV, as against high impedance testing at stations I and II.

The duplication of high tests and low tests renders the chance that a defective device may fail of rejection at station V exceedingly remote, since the chance that a defective device may pass a single test without being rejected (as a result of failure of the apparatus to function properly) is only about 1 in 100,000. Aside from considerations of extreme caution, such duplication of identical tests is of course superfluous: e. g., only the tests at stations I and III might be performed, while all the parts involved in testing at stations II and IV might be removed, including the corresponding pins 165 and the associated cams. Or the commutator 129 might, of course, be changed, and the machine adapted for testing at two stations only, so as to save the time required to present the devices D at the superfluous testing stations. Or, if just a single test (at station I) were desired, controller 129 might be entirely omitted and circuit 205 connected into circuit 201 in lieu of solenoid coil 172a—instead of being separately connected across the line P.

It is to be remarked that in the testing system as described and illustrated, the chances of failure are on the side of safety: e. g., failure of any galvanometer 190 to act will lead to rejection of all devices D that are tested; and so likewise will a broken lead or circuit to or in any testing set or control G or R, or failure of the power supply through the line P.

We claim:
1. In a machine of the character described, the combination of a plurality of testing connectors for devices to be tested and means for applying testing power to devices while each device is successively connected to the several connectors, with means for effecting a separation amongst devices that have been tested; means for controlling the action of said separating means, with an actuating circuit for said control means and a switch in said actuating circuit for controlling its energization; actuating members for said actuating-circuit switch, with means for imparting actuating movement to said actuating members independently of test results but in definite correlation with the applications of testing power to devices as aforesaid; means for rendering said actuating members active to actuate the aforesaid actuating-circuit switch, including auxiliary circuits; and means responsive to the behavior of a device under test at each of said connectors for controlling the energization of said auxiliary circuits, and thus also controlling the energization of the aforesaid actuating circuit and the action of said separating means.

2. In a machine of the character described, the combination of a testing connector for devices to be tested and means for applying testing power to devices in succession while they are successively connected to said connector, with means for effecting a separation amongst devices that have been tested; means for controlling the action of said separating means, including an actuating circuit, a plurality of auxiliary circuits, control switches in a plurality of the aforesaid circuits, actuating members for the aforementioned switches with means for imparting actuating movement to said actuating members independently of test results but in definite correlation with the application of testing power to devices as aforesaid, and means in the several auxiliary circuits for rendering said actuating members active to actuate the several control switches; and means responsive to the behavior of a device when tested at various connectors for controlling the energization of various auxiliary circuits, and thus also ultimately controlling the energization of said actuating circuit and the action of said separating means.

3. In a machine of the character described, the combination with a plurality of testing connectors for devices to be tested and means for applying testing power to the devices, in succession, while they are connected to the connectors, means for effecting a separation amongst devices that have been tested and actuating means normally effective to operate said separating means, means for imparting actuating movement to said actuating means independently of test results but in definite correlation with the applications of testing power as aforesaid, and means responsive only to satisfactory behavior of a device under all tests for rendering said actuating and separating means inoperative with respect to said device.

4. In a machine of the character described, the combination with a plurality of testing connectors, means for the travel of devices to be tested to and from the several connectors in succession, and means for applying testing power to the devices in succession while they are connected to the connectors; of means for rejecting devices from the machine after being tested as aforesaid, and actuating means normally effective to operate said rejecting means, with means for operating said actuating means in definite correlation with the travel of devices as aforesaid but independently of test results; control means for the aforesaid actuating and rejecting means including other actuating means moving in definite correlation with the travel of devices as aforesaid but independently of test results; and means responsive only to satisfactory behavior of a device under all tests for enabling said control means and its actuating means last mentioned to render the first-mentioned actuating and rejecting means ineffective to reject said device.

5. In a machine of the character described, the combination of a plurality of testing connectors for devices to be tested and means for applying testing power to the devices while they are connected to the connectors, with means for rejecting devices from the machine after test, actuating means for said rejecting means and means for imparting actuating movement to said actuating means independently of test results but in definite correlation with the applications of testing power as aforesaid, means for connecting and disconnecting said actuating means to and from said rejecting means, control means for said connecting and disconnecting means including circuits corresponding to the several connectors, and means responsive to the behavior of a device under test at any of said connectors for controlling the energization of the circuits.

6. In a machine of the character described, the combination of a plurality of testing connectors for devices to be tested and means for applying testing power to the devices while they are connected to the connectors, with means for rejecting devices after test, actuating means for said rejecting means and means for imparting actuating movement to said actuating means independently of test results but in predetermined correlation with the applications of testing power as aforesaid, means for connecting and disconnecting said actuating means to and from said rejecting means, control circuit means for said connecting and disconnecting means including switch means corresponding to various connectors, actuating means for switch means aforesaid moving in predetermined correlation with the applications of testing power to the devices as aforesaid but independently of test results, and means responsive to the behavior of a device under test at any of said connectors for controlling actuation of switch means aforesaid by the last-mentioned actuating means.

7. In a machine of the character described the combination of a plurality of testing connectors, means for the travel of devices to be tested to and from the several connectors in succession, and means for applying testing power to the devices, in succession, while they are connected to the connectors, with means for rejecting devices after test, actuating means for said rejecting means and means for imparting actuating movement to said actuating means in definite correlation with the travel of devices as aforesaid but independently of test results, means for connecting and disconnecting said actuating means to and from said rejecting means, control circuit means for said connecting and disconnecting means including switch means corresponding to various connectors, actuating means for switch means aforesaid moving in definite correlation with the travel of devices from connector to connector but independently of test results, and means responsive to the behavior of a device under test at any of said connectors for controlling the actuation of switch means aforesaid by said actuating means.

8. In a machine of the character described, the combination of a plurality of testing connectors for devices to be tested and means for applying testing power to the devices, in succession, through the several connectors, with means for effecting a separation amongst devices that have been tested, control means for said separating means including an actuating circuit, a series of auxiliary circuits with a control switch in each of them, and auxiliary switches in circuits aforesaid of said control means, actuating members for said auxiliary switches operated independently of test results but in definite correlation with the applications of testing power through corresponding connectors as aforesaid, means controlled by the several auxiliary circuits for rendering effective or ineffective the actuating members affecting the auxiliary switches in succeeding circuits of said control means, and means responsive to the behavior of devices under test for actuating said control switches.

9. In a machine of the character described, the combination of a plurality of testing connectors for devices to be tested and means for applying testing power to the devices, in succession, through the several connectors, with means for effecting a separation amongst devices that have been tested, control means for said separating means including an actuating circuit, a series of auxiliary circuits with a control switch in each of them, and auxiliary switches in circuits aforesaid of said control means, actuating members for said auxiliary switches operated independently of test results but in definite correlation with the applications of testing power through corresponding connectors as aforesaid, means controlled by the several auxiliary circuits for rendering effective or ineffective the actuating members affecting the auxiliary switches in succeeding circuits of said control means, means operating in correlation with said actuating members for timing the energization of said auxilary circuits, and means responsive to the behavior of devices under test for actuating said control switches.

10. In a machine of the character described, the combination of a plurality of testing connectors for devices to be tested and means for applying testing voltage to the devices, in succession, through the several connectors, with means for effecting a separation amongst devices that have been tested, control means for said separating means including an actuating circuit, a series of auxiliary circuits with a control switch in each of them, and auxiliary switches in circuits aforesaid of said control means, actuating members for said auxiliary switches operated independently of test results but in definite correlation with the applications of testing voltage through corresponding connectors as aforesaid, means controlled by the several auxiliary circuits for rendering effective or ineffective the actuating members affecting the auxiliary switches in succeeding circuits of said control means, and means responsive to the behavior of devices under the applied voltage, according to the impedances of said devices, for actuating said control switches.

11. In a machine of the character described, the combination of a plurality of testing connectors for devices to be tested and means for applying testing power to the devices, in succession, through the several connectors, with means for effecting a separation amongst devices that have been tested and actuating means therefor, means for operatively connecting and disconnecting said actuating means to and from said separating means, control means for said connecting and disconnecting means including an actuating circuit, a series of auxiliary circuits with a control switch in each of them, and auxiliary switches in circuits aforesaid of said control means, actuating members for said auxiliary switches operating in correlation with the aforesaid testing power applying means, means controlled by the several auxiliary circuits for rendering effective or ineffective the actuating members affecting the auxiliary switches in succeeding circuits of said control means, and means responsive to the behavior of devices under test for actuating said control switches.

12. In a machine of the character described, the combination of a plurality of testing circuits with means for connecting devices to be tested successively to them and means for applying testing voltage to the devices through the several testing circuits, with means for effecting a separation amongst devices that have been tested, control means for said separating means including an actuating circuit, a series of auxiliary circuits with a relay switch in each of them, auxiliary switches in circuits aforesaid of said control means, and actuating members for said auxiliary switches operating in correlation with the aforesaid voltage applying means, means controlled by the several auxiliary circuits for rendering effective or ineffective the actuating members affecting the auxiliary switches in succeeding circuits of said control means, and means responsive to the behavior of devices under test for actuating said relay switches including mirror galvanometers bridged across said testing circuits, light-sensitive means responsive to movement of the galvanometer mirrors, and means for energizing said relay switches controlled by said light-sensitive means.

13. In a machine of the character described, the combination of a testing connector and means for applying testing power to devices while they are connected to said connector, means for the travel of devices to be tested comprising a series of carriers severally comprising means for holding the current leads of devices carried by said carriers, and means responsive to the behavior of devices under test for removing them from said carriers and engaging their current leads and moving said leads sidewise out of said holding means.

14. In a machine of the character described, the combination with successive sets of contacts, and means for the travel of devices to be tested from one set of contacts to another and for connecting the devices across contacts of each set, of testing circuits for applying direct current voltage to the devices reversely connected to contacts of said successive sets, and test-controlled means responsive to the currents flowing in said testing circuits also reversely connected to the contacts of successive sets.

15. In a machine of the character described, the combination with successive sets of contacts, and means for the travel of devices to be tested from one set of contacts to another and for connecting the devices across the contacts of each set, of a Kelvin double bridge circuit including a power circuit reversely connected to contacts of successive sets for applying direct current voltage to the devices, and a measuring circuit also reversely connected to contacts of successive sets and including test responsive means.

16. In a machine of the character described, the combination with successive sets of contacts and means for the travel of devices to be tested from one set of contacts to another, of a Kelvin double bridge circuit including a power circuit reversely connected to contacts of successive sets for applying direct current voltage to the devices, and a measuring circuit also reversely connected to contacts of successive sets, means for rejecting devices from said means of travel and actuating means for said rejecting means operated independently of test results but in definite correlation with the travel of the devices as aforesaid, with means for controlling the actuation of said rejecting means by said actuating means including responsive means in said measuring circuit.

17. In a machine of the character described, the combination of a plurality of testing connectors, and means for the travel of devices to be tested to and from the several connectors in succession, with means for applying testing power to the devices through said connectors, means for rejecting devices from said means of travel after test at the several connectors and actuating means for said rejecting means operated independently of test results but in definite correlation with the travel of the devices as aforesaid, and means responsive to satisfactory behavior of a device under test at the several connectors for rendering said actuating and rejecting means ineffective to reject said device.

18. In a machine of the character described, the combination of a testing connector, and means for feeding devices to be tested, stepwise, to and from said connector, with means for applying testing power to devices through said connector during pauses in the feed movement, means for releasing devices from said feeding means and actuating means for said releasing means, means for imparting actuating movement to said actuating means independently of test results during pauses in the feed movement, and means responsive to test results for connecting and disconnecting said actuating means to and from said releasing means.

19. In a machine of the character described, the combination with a testing connector, means for feeding devices to be tested to and from said connector, means for applying testing power to the devices, through said connector, means for releasing devices from said feeding means and actuating means therefor, and means for imparting actuating movement to said actuating means independently of test results but in definite correlation with the application of testing power as aforesaid, of means for connecting and disconnecting said actuating means to and from said releasing means, means for actuating said connecting and disconnecting means during pauses of the first-mentioned actuating means, including an actuating circuit with switch means therefor and means for periodically closing said switch means in correlation with the application of testing power through said connector, and means responsive to the behavior of devices under test for controlling energization of said actuating circuit.

20. In a machine of the character described, the combination of a plurality of testing connectors, and means for the travel of devices to be tested to and from the several connectors in succession, and for also rejecting them after test, with means for applying testing power to the devices while they are connected to the connectors, means severally responsive to the behavior of the devices under test at the several connectors for indicating such behavior, and determining means severally influenced by said responsive means for determining rejection of a device as aforesaid according to its behavior under test at any of said connectors, and for enabling each of said determining means to predetermine rejective action of any and all of said determining means that would otherwise be controlled by later test of said device, at any of said connectors subsequently reached by the device in its travel as aforesaid.

21. In a machine of the character described, the combination of a plurality of testing connectors, means for feeding devices to be tested to and from the several connectors in succession, with a drive for said feeding means, and means for applying testing power to the devices through said connectors, with means actuated from the drive to said feeding means for rejecting devices after test, and means responsive to the behavior of a device under test at all of said connectors for rendering said rejecting means ineffective to reject said device when its behavior is satisfactory under all tests, so that failure of the testing means or of the responsive means to function results in rejection, as well as unsatisfactory behavior of a device under any test.

22. In a machine of the character described, the combination of a plurality of testing circuits with means for connecting devices to be tested to them, means for feeding devices to be tested to and from the several connecting means in succession, with a drive for said feeding means, and means for applying testing voltage to the devices through the several testing circuits, with means actuated from the drive to said feeding means for rejecting devices after test, means including an actuating circuit for preventing rejection of a device by said rejecting means, and means responsive to behavior of a device under test at all said testing circuits for energizing said actuating circuit when the behavior of said device is satisfactory under all tests, so that failure of circuits or of power for energizing them automatically results in rejection, as well as unsatisfactory behavior of a device under any test.

23. In a machine for testing devices of the character described by a plurality of tests applied to each device, the combination with means for effecting a separation amongst devices that have been tested, of control means therefore including an actuating circuit, a series of auxiliary circuits with a control switch in each of them, and auxiliary switches in circuits aforesaid of said control means, a moving carrier operating in correlation with the testing of devices and carrying actuating members for said auxiliary switches shiftable relative to the carrier into active and inactive positions, means controlled by the several auxiliary circuits for shifting said actuating members to one of their positions aforesaid, and means responsive to the behavior of devices under the several tests for actuating corresponding control switches aforementioned.

24. In a machine for testing devices of the character described, the combination with means for effecting a separation amongst devices that have been tested, of control means therefor including a series of switches, a moving carrier operating in correlation with the testing of devices and carrying actuating members for said switches shiftable relative to the carrier into alternative positions, means responsive to the behavior of a device under test for shifting an actuating member to one of its positions aforesaid, and means controlled by resulting actuation of a corresponding switch for enabling said actuating members to be shifted in response to a succeeding test of the device.

25. In a machine for testing devices of the character described, the combination with means for applying a series of tests to each device, and means for effecting a separation amongst devices that have been tested, of a series of switches severally corresponding to various tests aforesaid, and each controlling the action of said separating means, a moving carrier operating in correlation with the testing of devices and carrying a series of actuating members, for engaging and operating said switches, shiftable relative to the carrier into alternative positions, and means controlled by various switches aforesaid, and also responsive to the behavior of devices under test, for shifting the actuating members to one of their positions aforesaid.

26. In a machine for testing devices of the character described, the combination with means for applying a series of tests to each device, and means for effecting a separation amongst devices that have been tested, of means for preventing action of said separating means comprising a series of switches severally corresponding to various tests aforesaid, a moving carrier operating in correlation with the testing of devices and carrying a series of actuating members for said switches shiftable relative to the carrier into alternative switch-actuating and inactive positions, and means responsive to satisfactory behavior of a device under test, but only when the corresponding switch is closed, for shifting an actuating member into switch-actuating position.

27. The combination of a series of switches, a moving carrier carrying actuating members for said switches shiftable relative to the carrier into active and inactive positions, and means controlled by switches of the series for shifting various actuating members into active positions, thus causing them to actuate succeeding switches of the series.

28. The combination of a series of switches, a moving carrier carrying actuating members for said switches shiftable relative to the carrier into active and inactive positions, shifters interposed after the several switches of the series, and controlled by said switches, for shifting various actuating members into active positions, thus causing them to actuate succeeding switches of the series, and means for rendering each shifter inactive directly after the shifting of an actuating member thereby as aforesaid.

29. The combination of a series of switches, a moving carrier carrying actuating members for said switches shiftable relative to the carrier into active and inactive positions, shifting means stationed adjacent the carrier and movable relative thereto to shift any of said actuating members into active position, and means carried by said carrier for returning the shifting means to inactive position after it acts on an actuating member.

30. The combination of a series of switches, a moving carrier carrying actuating members for said switches shiftable relative to the carrier into active and inactive positions, shifting means stationed adjacent the carrier and movable relative thereto to shift any of said actuating members into active position, as such actuating member passes the corresponding shifting means, when a corresponding switch is to be actuated, means also stationed adjacent the carrier for returning the actuating member in question to inactive position before it reached a succeeding switch of the series, and means carried by said carrier for returning the shifting means to inactive position after it acts on an actuating member.

31. The combination with a supporting structure and an associated moving carrier, of switches on said supporting structure each having actuating arms at opposite sides of said carrier, actuating members for said switches on said carrier shiftable relative thereto to engage switch actuating arms at either side of the carrier, and means on said supporting structure for shifting said actuating members to project from either side of the carrier into the path of said arms, according to the desired actuation of the switches by said actuators.

32. The combination with a rotating carrier and a surrounding casing, of a series of switches around said casing each having actuating arms at opposite sides of said carrier, within the casing, actuating pins for said arms extending and shiftable longitudinally through said carrier, with detent means for holding said pins in a position of projection to one side of the carrier, and means around said casing for pushing any of said pins into the detent-held position aforesaid when a corresponding switch is to be actuated, and for thereafter pushing said pin back before it reaches a succeeding switch of the series.

33. The combination with a rotating carrier and a surrounding casing, of rocking switches around said casing each having actuating arms at opposite sides of its axis and of said carrier, within the casing, actuating pins for said arms extending and shiftable longitudinally through said carrier, with detent means for holding said pins in alternative positions of projection to either side of the carrier, shifting means around said casing for pushing actuating pins into one detent-held position, and cam means on the casing for pushing back said pins into another detent-held position.

34. The combination with a rotating carrier and a surrounding casing, of switches around said casing each having actuating arms at opposite sides of said carrier, within the casing, actuating pins for said arms extending and shiftable longitudinally through said carrier, with detent means for holding said pins in alternative positions of projection to either side of the carrier, pushers stationed around said casing for pushing said actuating pins into one detent-held position, operating levers for said pushers fulcrumed in the central region of the casing and extending outward beyond said pushers, electro-magnetic means around the casing connected to the outer ends of said levers for operating them, cam means on the casing for pushing back said pins into another detent-held position, and cam means on said carrier for returning said levers and pushers after their operation by said electromagnetic means.

35. In a machine of the character described, the combination of a plurality of testing connectors for devices to be tested and means for applying testing power to the devices, in succession, through the several connectors, with means for effecting a separation amongst devices that have been tested, control means for said separating means including a plurality of actuating members and a series of actuators disposed in various positions and operated by said members, the last of which actuators operates said separating means while the antecedent actuators correspond to various testing connectors and are rendered inoperative independently of test results but in definite correlation with the applications of testing power as aforesaid, and means responsive to the behavior of a device under test for rendering the actuating member corresponding to the device under test effective and, when thus effective, rendering effective the succeeding actuator of the series.

36. In a machine of the character described, the combination of a plurality of testing connectors for devices to be tested and means for applying testing power to the devices, in succession, through the several connectors, with means for rejecting devices after test, actuating means for said rejecting means operated periodically independently of test results, means for connecting and disconnecting said periodically operated actuating means to and from said rejecting means, control means including a plurality of actuating members and a series of actuators operated by said members, the last of which actuators operates said connecting and disconnecting means while the antecedent actuators correspond to various testing connectors and are rendered inoperative independently of test results but in definite correlation with the applications of testing power, and means responsive to the behavior of a device under test for rendering the actuating member corresponding to the device under test effective and, when thus effective, rendering effective the succeeding actuator of the series.

STANLEY L. HANDFORTH.
CHARLES R. JOHNSON.

REFERENCES CITED

The following references are of record in the file of this patent:

UNITED STATES PATENTS

| Number | Name | Date |
|---|---|---|
| 2,016,455 | Purdy | Oct. 8, 1935 |
| 2,244,338 | Krebs | June 3, 1941 |
| 2,217,342 | Ladrach | Oct. 8, 1940 |
| 2,221,323 | Gammeter | Nov. 12, 1940 |
| 939,109 | Switzer | Nov. 2, 1909 |
| 1,814,437 | Du Mont | July 14, 1931 |
| 2,016,455 | Purdy | Oct. 8, 1935 |
| 1,853,639 | Robinson | Apr. 12, 1932 |
| 676,034 | Elliott | June 1, 1901 |
| 2,020,964 | Reiter | Nov. 12, 1935 |
| 1,984,031 | Purdy | Dec. 11, 1934 |
| 2,138,645 | Rey | Nov. 29, 1938 |
| 1,254,690 | Hazard | Jan. 29, 1918 |

FOREIGN PATENTS

| Number | Country | Date |
|---|---|---|
| 26,639 | British | 1912 |

OTHER REFERENCES

Laws, "Electrical Measurements," McGraw-Hill, 1917, pages 159–161. (Copy in Div. 48.)